(12) United States Patent
Araki et al.

(10) Patent No.: US 6,723,836 B1
(45) Date of Patent: Apr. 20, 2004

(54) LOW ODOR POLYOXYALKYLENE POLYOL, PROCESS FOR PRODUCING THE SAME AND URETHANE COMPOSITION

(75) Inventors: Kiminori Araki, Kanagawa (JP); Kazunori Ishikawa, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/552,886

(22) Filed: Apr. 20, 2000

(30) Foreign Application Priority Data

Apr. 23, 1999 (JP) .......................... 11-116496

(51) Int. Cl.⁷ .................. C07H 15/08; C08L 71/02; C08G 18/52; C07C 59/285
(52) U.S. Cl. ............... 536/18.3; 536/120; 523/102; 528/76; 528/77; 562/587
(58) Field of Search .............. 536/120, 18.3; 562/587; 523/102; 528/76, 77

(56) References Cited

U.S. PATENT DOCUMENTS

| | | | |
|---|---|---|---|
| 3,503,910 A | | 3/1970 | Amberg et al. ............ 260/18 |
| 4,332,936 A | * | 6/1982 | Nodelman ................. 536/120 |
| 5,672,768 A | | 9/1997 | Gupta et al. ............. 568/621 |

FOREIGN PATENT DOCUMENTS

| | | | |
|---|---|---|---|
| EP | 0395316 | * | 10/1990 |
| EP | 0 538 881 A2 | | 4/1993 |
| GB | 2 147 593 A | | 5/1985 |
| JP | 06049167 A | * | 2/1994 |
| JP | 07316284 | | 12/1995 |
| JP | 09/194588 | | 7/1997 |
| JP | 10036499 | | 2/1998 |
| JP | 10081743 | | 3/1998 |
| JP | 10081744 | | 3/1998 |
| JP | 11060721 | | 3/1999 |
| JP | 11060722 | | 3/1999 |

* cited by examiner

*Primary Examiner*—Alan L. Rotman
*Assistant Examiner*—Taylor V. Oh
(74) *Attorney, Agent, or Firm*—Finnegan, Henderson, Farabow, Garrett & Dunner LLP

(57) ABSTRACT

To provide low odor polyoxyalkylene polyol, a process for producing the same, and a low odor urethane prepolymer and a low odor urethane composition using the same as a raw material. The low odor polyoxyalkylene polyol comprising polyoxyalkylene polyol with amine added thereto, the amine having at least one amino group represented by the following formula (1):

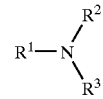

is provided, wherein $R^1$, $R^2$ and $R^3$ independently represent hydrogen atom or an organic group which may contain a hetero atom in which an atom bonded to nitrogen atom is carbon atom.

7 Claims, No Drawings

LOW ODOR POLYOXYALKYLENE POLYOL, PROCESS FOR PRODUCING THE SAME AND URETHANE COMPOSITION

FIELD OF THE INVENTION

The present invention relates to a low odor polyoxyalkylene polyol, a process for producing the same, and a low odor urethane prepolymer and a low odor urethane composition which use the polyoxyalkylene polyol as their raw materials.

BACKGROUND OF THE INVENTION

Polyoxyalkylene polyol such as polypropylene glycol is widely used as a solvent or a synthetic raw material for a polyurethane or a modified silicone resin, but there has conventionally been the problem of its odor. This polyoxyalkylene polyol is generally obtained by ring opening addition polymerization of an alkylene oxide (epoxide) using a polyol such as ethylene glycol, glycerin or sucrose, as a polymerization initiator. However, odor of polyoxyalkylene polyol varies depending on a solvent, a catalyst or the like used in the course of the production. Methods of avoiding odor of polyoxyalkylene polyol when producing the same have conventionally been proposed. For example, a method of using polyoxyalkylene polyol in place of dimethylformamide (DMF) in order to avoid odor of DMF that is used as a solvent for sucrose as a polymerization initiator (Japanese Patent Application Laid-open No. Hei 9(1997)-194588, Japanese Patent Application Laid-open No. Hei 10(1998)-81743, Japanese Patent Application Laid-open No. Hei 10(1998)-81744, etc.) and a method of using a phosphagen compound in order to avoid amine odor when amine is used as a polymerization catalyst (Japanese Patent Application Laid-open No. Hei 10(1998)-36499, Japanese Patent Application Laid-open No. Hei 11(1999)-60721, Japanese Patent Application Laid-open No. Hei 11(1999)-60722, etc.) have been proposed.

Of the odor of polyoxyalkylene polyol, aldehyde odor is unpleasant when using the polyoxyalkylene polyol, and besides, because of its inherent persistency, offensive odor clings to clothes after working. Further, urethane composition, its molded product, and the like using the polyoxyalkylene polyol also have the offensive odor. In particular, solution is urgently demanded to reduce aldehyde odor for the application in which a foamed urethane product is used in a closed space, as in the case of automotive upholsteries.

It is known that aldehyde is by-produced by oxidation of alkylene oxide which is a synthetic raw material of polyoxyalkylene polyol, and in some cases the aldehyde may be contained in the raw material alkylene oxide in the order of several to several tens ppm. Further, a method is proposed to suppress formation of aldehyde when producing polyoxyalkylene polyol. For example, it is proposed to use carbonate or bicarbonate of cesium as a polymerization catalyst in order to avoid alkali corrosion of alkylene oxide due to an alkali metal (Japanese Patent Application Laid-Open No. Hei 7(1995)-316284). Furthermore, in the production of polyoxyalkylene polyol using the phosphagen compound as a catalyst, it is proposed to control oxygen density together with addition of an antioxidant at purification in order to suppress formation of aldehyde and peroxide when purifying (vacuum treatment) a crude polyoxyalkylene polyol obtained by polymerization.

However, most of commercially available polyoxyalkylene polyols still have aldehyde odor.

SUMMARY OF THE INVENTION

The present invention has been made in view of the above prior art, and an object of the present invention is therefore to provide a low odor polyoxyalkylene polyol, a process for producing the low odor polyoxyalkylene polyol and a low odor urethane composition using the low odor polyoxyalkylene polyol as a raw material.

As a result of extensive investigations to obtain polyoxyalkylene polyol having low aldehyde odor, it has been found that a low odor polyoxyalkylene polyol is easily obtained by adding an amine having a specific structure to polyoxyalkylene polyol, and that, when this polyoxyalkylene polyol is used as a production raw material, a urethane composition which has low odor and which is not influenced by the amine is obtained. The present invention has been completed based on those findings.

A low odor polyoxyalkylene polyol according to the present invention comprises polyoxyalkylene polyol with amine added thereto, the amine having at least one amino group represented by the following formula (1):

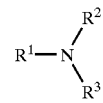

wherein $R^1$, $R^2$ and $R^3$ independently represent hydrogen atom or an organic group which may contain a hetero atom in which an atom bonded to nitrogen atom is carbon atom.

The added amount of the above amine to the polyoxyalkylene polyol is generally 10,000 ppm or less.

Of $R^1$, $R^2$ and $R^3$ in the above formula (1), it is preferable that at least one of those is hydrogen atom and at least one of those is an aliphatic hydrocarbon group which may contain hetero atom and/or aromatic group.

An amine containing at least one primary amino group in which any two of $R^1$, $R^2$ and $R^3$ are hydrogen atoms is particularly preferable in the present invention.

Further, an amine containing a single amino group described above, i.e., monoamine, is also preferable.

The amine has preferably a boiling point of 100° C. or higher under ordinary pressure.

The above-described low odor polyoxyalkylene polyol can be obtained by, for example, adding the amine represented by the above formula (1) to polyoxyalkylene polyol obtained by polymerization of oxyalkylene, and heating the resulting mixture under reduced pressure.

The present invention also provides a low odor urethane prepolymer using the above polyoxyalkylene polyol as a raw material, and a low odor urethane composition containing the urethane prepolymer. Since the amine reacts at the synthesis of the urethane prepolymer, amine derived from the low odor polyoxyalkylene polyol does not remain in the urethane prepolymer and the urethane composition containing the same.

DETAILED DESCRIPTION OF THE PREFERRED EMBODIMENT

The present invention is described in detail below.

A low odor polyoxyalkylene polyol according to the present invention comprises polyoxyalkylene polyol with amine added thereto, the amine having a specific structure as will be described later.

In the present invention, the polyoxyalkylene polyol to which the amine is added includes a wide variety of known polyoxyalkylene polyols, and production conditions thereof such as a polymerization initiator, a catalyst, production raw materials, reaction conditions and the like are not particularly limited. Further, there is no particular limitation on molecular weight of the polyoxyalkylene polyol, type of polymerization, structural unit, polymerization manner and the like. However, polyoxyalkylene polyol having aldehyde odor is normally used.

The polyoxyalkylene polyol used in the present invention is generally the one obtained by ring opening polymerization of alkylene oxide (epoxide) using an active hydrogen compound as a polymerization initiator. However, a compound containing an ester component may also be used if it has aldehyde odor.

Examples of the alkylene oxide include ethylene oxide, propylene oxide, butylene oxide, tetramethylene oxide, styrene oxide, cyclohexene oxide, epichlorohydrin, epibromohydrin, methyl glycidyl ether, allyl glycidyl ether and trifluoropropylene oxide. The polyoxyalkylene polyol may contain units derived from two or more kinds of the above compounds.

The polyoxyalkylene polyol preferably used in the present invention contains, of those listed above, units derived from ethylene oxide, propylene oxide, butylene oxide or the combination thereof.

Examples of the active hydrogen compound includes alcohols, phenol compounds, polyamines and alkanol amines. More specifically, included in examples of the active hydrogen compounds are: monohydric alcohols such as methanol, ethanol or butanols; water; dihydric alcohols such as ethylene glycol, diethylene glycol, propylene glycol, dipropylene glycol, 1,3-propane diol, 1,4-cyclohexane diol, 1,3-butane diol, 1,4-butane diol, pentane diol, neopentyl glycol, 1,6-hexane diol, 1,4-cyclohexane diol or cyclohexane dimethanol; alkanol amines such as monoethanol amine, diethanol amine or triethanol amine; polyhydric alcohols such as glycerin, diglycerin, polyglycerol, trimethylol propane, 1,2,5-hexane triol, pentaerythritol, dipentaerythritol or tripehtaerythritol; saccharides or derivatives thereof, such as glycose, sorbitol, dextrose, fluctose, sucrose, α-methyl glucoside and α-hydroxyethyl glucoside; aliphatic amines such as ethylene diamine, di(2-aminoethyl)amine or hexamethylene diamine; aromatic amines such as toluylene diamine, or diphenylmethane diamine; and phenol compounds such as bisphenol A, bisphenol F, bisphenol S, novolak, resole, hydroquinone, resorcin or catechol. Those are used alone or as mixtures of two or more thereof.

Examples of the ester component which may be contained in the polyoxyalkylene polyol include units derived from polyol and polybasic carboxylic acid such as low molecular weight carboxylic acid (e.g., glutaric acid, adipic acid, azelaic acid, pimelic acid, suberic acid, sebacic acid, terephthalic acid, isophthalic acid, dimer acid) or hydroxy carboxylic acid (e.g., oligomeric acid, castor oil or a reaction product of castor oil and ethylene glycol); and ring opening polymerization units such as propionlactone or valerolactone. Two or more kinds of those units may be contained. As a specific examples of the polyol, the compounds having two or more hydroxyl groups, of the compounds listed as the active hydrogen compounds in the above may be presented.

Examples of the polyoxyalkylene polyol containing ester unit include, specifically, polyester polyol, lactone-based polyol and polycarbonate diol.

Production conditions, such as reaction temperature, pressure or reaction time, in producing the polyoxyalkylene polyol are not particularly limited. Further, a crude polyoxyalkylene polyol synthesized may be subjected to a known purification method such as reduced pressure treatment, and may contain a known antioxidant.

The polyoxyalkylene polyol to which the amine is added is appropriately selected in view of the physical properties or the like depending on the use of end products. Of various polyoxyalkylene polyols, general purpose polyoxyalkylene polyols such as polypropylene polyol (PPG), polyoxyethylene polyol or propylene oxide-ethylene oxide block copolymer are particularly preferable in the present invention.

Examples of the odorous aldehyde contained in such a polyoxyalkylene polyol normally include low molecular weight aldehydes such as acetoaldehyde or propionaldehyde (propyl aldehyde). It is regarded that commercially available polyoxyalkylene polyol products contain aldehydes generally in an amount of about 5 to 50 ppm.

The amine added to the polyoxyalkylene polyol is represented by the following formula (1):

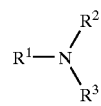

wherein $R^1$, $R^2$ and $R^3$ independently represent hydrogen atom or an organic group which may contain a hetero atom in which an atom bonded to nitrogen atom is carbon atom, at least one of $R^1$, $R^2$ and $R^3$ may represent a divalent group.

Examples of the amine represented by the formula (1) are as follows:

Primary amino group-containing amines such as butyl amine, 1,2-dimethylbutyl amine, hexyl amine, isoamyl amine, 2-octyl amine, aminobutanol, 3-decyloxypropyl amine, 3-methoxypropyl amine, 3-isobutoxypropyl amine, 3-lauryloxypropyl amine, 3-myristyloxypropyl amine, lauryl amine, hexadecyl amine, stearyl amine, oleyl amine, polyoxypropylene amine (trade names: Jefermin D230, D-400 and D-2000, products of Sanseki Texaco Chemical Co.), dimethylaminoethyl amine, ethylaminoethyl amine, diaminopropane, dibutylaminopropyl amine, 2-hydroxyethylaminopropyl amine, bis(3-aminopropyl) ether, diaminobutene, 1,9-nonane diamine, N-aminoethyl piperidine, N-aminopropyl morpholine, iminobispropyl amine, N,N'-bisaminopropyl-1,4-butylene diamine, polyallyl amine;

secondary amines such as dipropyl amine, dioctyl amine, di(2-ethylhexyl)amine, N-ethyl-isoamyl amine, distearyl amine, N-methylstearyl amine; and tertiary amines such as dimethylpalmityl amine, dimethylmyristyl amine, dimethylbehenyl amine, dimethylstearyl amine.

Of the above compounds, compounds in which at least one of $R^1$, $R^2$ and $R^3$ is hydrogen atom and at least one of $R^1$, $R^2$ and $R^3$ is an aliphatic hydrocarbon group that may contain hetero atom and/or aromatic group are preferable.

An amine having at least one primary amino group in which any two of $R^1$, $R^2$ and $R^3$ are hydrogen atoms is particularly preferable in the present invention.

Further, an amine having a single amino group described above, i.e., a monoamine, is preferable.

The amine has preferably a boiling point of 100° C. or higher under ordinary pressure.

Examples of the particularly preferable amine include distearyl amine, steary amine and lauryl amine.

Use of the above amine makes it possible to deodorize aldehyde odor without newly arising another problem of amine odor due to addition of amine. To attain this effect, the amine is added desirably in an amount of 10,000 ppm (wt) or less. Specifically, the amount is generally 10 to 10,000 ppm, preferably 50 to 1,000 ppm.

Production conditions such as reaction temperature, pressure, reaction time and other additives, in producing the above low odor polyoxyalkylene polyol are not particularly limited. However, it is preferable to add the amine to the polyoxyalkylene polyol previously prepared and then heating the resulting mixture. Stirring is also preferable. For example, it is preferable to add the amine to a polyoxyalkylene polyol obtained by polymerization of oxyalkylene, and then heating the resulting mixture under reduced pressure.

Jerry March, "Advanced Organic Chemistry", third edition, pp. 796–798, Wiley-Interscience Publication JOHN WILEY & SONS describes the reaction of an amine with aldehyde. As described in the book, it is known that aldehyde is reacted with a primary amine to form an imine, aldehyde is reacted with a secondary amine to form an enamine and aldehyde is reacted with a tertially amine to form a salt. As a result, aldehyde is derived into the above compound having very less odor and thus odor can be suppressed.

Reactivity of aldehyde to the amine decreases in the order of primary amine, secondary amine and tertially amine. Therefore, the primary amine is most effective. Further, reactivity of aldehyde to an aliphatic amine is higher than the reactivity of aldehyde to an aromatic amine such as aniline. Therefore, use of the aliphatic amine is more effective.

The reaction of aldehyde with an amine is accelerated by heating. Further, the reaction forming an imine or an enamine is dehydration reaction. Therefore, if water is present in the reaction system, the reaction may not proceed or the imine or enamine formed may be decomposed to return to the original aldehyde and amine. For this reason, a dehydrating agent such as sodium sulfate, magnesium sulfate, calcium chloride or molecular sieve is added to the reaction system. Odor can be removed more effectively by conducting the reaction while heating under reducing pressure.

The degree of the reduced pressure is preferably 39.9 kPa (300 mmHg) or lower, more desirably 13.3 kPa (100 mmHg) or lower.

The reaction temperature is preferably 60 to 140° C., more desirably 80 to 120° C.

The amine is preferably added after completion of the polymerization of alkylene oxide. More specifically, the amine is preferably added in the state that unreacted alkylene oxide does not remain, or added in an equivalent larger than that of the unreacted alkylene oxide. The reason for this is that if alkylene oxide remains in the reaction system, the amine added reacts with the alkylene oxide, so that primary amine converts into secondary amine or tertiary amine and secondary amine converts into tertiary amine, thereby the ability to remove aldehyde decreases.

In particular, a step of dehydration drying the polyoxyalkylene glycol is involved in producing a urethane prepolymer, and it is economically preferable to add the amine at that time.

Amount of the odorous low molecular weight aldehyde in the low odor polyoxyalkylene polyol is less as compared with the amount prior to addition of the amine. The amount of aldehyde can be measured by a normal instrument analytical method such as head space gas chromatography. In the present invention, the amount of the odorous low molecular weight aldehyde contained in the low odor polyoxyalkylene polyol is preferably lower than the detective limit of this analytical method. More specifically, the amount of acetaldehyde is preferably 0.1 ppm or lower and the amount of propionaldehyde is preferably 0.1 ppm or lower.

The low odor polyoxyalkylene polyol can be used as it is for a solvent free of offensive odor during or after working, and it can be used as it is for surfactants, hydraulic oils, lubricants, cosmetics, sanitary goods or medical products, or used as a synthetic raw material thereof. Further, the low odor polyoxyalkylene polyol is suitable for use in various synthetic raw materials. For instance, it may be applied to wide range of resins that generally uses a polyoxyalkylene polyol as a raw material. The low odor polyoxyalkylene polyol can suitably be used, for example, as a synthetic raw material for polyurethane, such as polymer dispersed polyol, isocyanate group-terminated prepolymer (urethane prepolymer), polyether ester polyol or polyoxyalkylene polyamine, or as a synthetic raw material for a modified silicone resin having polyether skeleton.

In particular, when it is used as a synthetic raw material for a urethane compound such as urethane polymer, low odor urethane polymer can be obtained as well as low odor urethane composition containing the same. This can overcome the odor problem of, for example, low odor urethane foamed material.

When the above polyoxyalkylene polyol is used as a raw material, synthetic products having low aldehyde odor can be obtained. Therefore, the present invention also provides a urethane composition containing a urethane polymer prepared using the polyoxyalkylene polyol as a raw material.

The urethane prepolymer can be prepared according to the method of obtaining the urethane prepolymer from general polyol and polyisocyanate. In this case, there is no particular limitation except that the polyoxyalkylene polyol is used as at least a part of the polyol component.

The polyisocyanate used in the preparation of the urethane prepolymer can be any polyisocyanate so long as it contains two or more isocyanate groups in one molecule, and known aromatic, aliphatic and alicyclic polyisocyanates can be used. In general, diisocyanate is used. Examples of the diisocyanate include 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, toluidine diisocyanate, xylylene diisocyanate, hexamethylene diisocyanate, isophorone diisocyanate, naphthalene diisocyanate, paraphenylene diisocyanate, norbornene diisocyanate, isopropenyl-$\alpha,\alpha$ dimethylbenzoyl diisocyanate and tetramethyl xylylene diisocyanate.

The polyoxyalkylene polyol is appropriately selected from the above-described compounds depending on molecular weight, the number of functional group or the like of the desired end product. Polyol and polyoxyalkylene polyol may be used by suitably combining two or more thereof.

In forming a urethane composition from the urethane prepolymer and a curing agent and/or a curing catalyst, the curing agent and/or curing catalyst are appropriately selected from known curing agents and curing catalysts depending on whether the objective composition is one-pack type or two-pack type. The amine in the polyoxyalkylene polyol reacts with the polyol together with polyisocyanate in preparing the urethane prepolymer. Therefore, the amine is not present in the form of amine in the urethane composition, and as a result, the amine does not decrease storage stability of the urethane composition regardless of one-pack type or two-pack type.

The above urethane composition can widely be used in general urethane compositions such as coating materials, sealing materials, adhesives, soft or hard polyurethane foams or polyurethane elastomers, or in molded products thereof. It is especially suitable for use as foamed molded products used in a closed space, as in automotive upholsteries and floor boards. Further, foamed molded product of the urethane composition does not impart odor to clothes or the like, and therefore suitably used as packaging materials for clothes.

The present invention is described in more detail referring to the following examples, but it should be noted that the invention is not limited thereto.

In the following examples, the amount of aldehyde in polyoxyalkylene polyol was measured with a gas chromatograph mass analyzer (GC-MS) using JMS-GCMATE GCMS SYSTEM, manufactured by Nippon Denshi Co.

Odor of polyoxyalkylene polyol and urethane prepolymer was evaluated by sealing a test piece in a metallic container (1 liter), allowing to stand it in an oven at 40° C. for 4 hours and evaluating the odor with a functional evaluation (five-grade evaluation). The evaluation results are shown by numerical values.

1: Markedly sensible
2: Obviously sensible
3: Sensible
4: Bearly sensible
5: Not sensible at all

REFERENCE EXAMPLES 1 AND 2

The results of measuring the amount of propyl aldehyde in commercially available products of polyoxyalkylene polyol as shown in Table 1 are shown in Table 1 together with the results of odor test.

Preparation of Urethane Prepolymer

MDI was added to polyoxyalkylene polyol such that the index (NCO/OH) was 2, and reaction was conducted at 80° C. for 12 hours in the presence of bismuth catalyst. Odor of the urethane prepolymer obtained is shown in Table 1.

EXAMPLE 1

1,000 g of polyoxyalkylene polyol shown in Reference Example 1 or 2 and amine in an amount shown in Table 1 were placed in a three-necked flask, and mixed with a mechanical stirrer under the treatment conditions shown in Table 1.

The amount of the obtained low odor polyoxyalkylene polyol was measured. The results obtained are shown in Table 1 together with the results of odor test.

Preparation of Urethane Prepolymer

Using the low odor polyoxyalkylene polyol obtained above, reaction was conducted in the same manner as in the Reference Examples. The results of odor test are shown in Table 1.

EXAMPLE 2

Amine was reacted in the same manner as in Example 1 except for changing a part of the reaction conditions so that the reaction was conducted at 100° C. under reduced pressure, thereby decreasing odor of the polyoxyalkylene polyol. A urethane prepolymer was then prepared using the polyoxyalkylene polyol. The results obtained are shown in Table 1.

EXAMPLE 3

Amine was reacted in the same manner as in Example 1 except that the type and amount of the amine used were changed as shown in Table 1, thereby decreasing odor polyoxyalkylene polyol. A urethane prepolymer was prepared using the polyoxyalkylene polyol. The results obtained are shown in Table 1.

EXAMPLES 4 TO 6

Odor of the polyoxyalkylene polyol was decreased in the same manner as in Example 2 except for using polyoxyalkylene polyol and amine as shown in Table 1. A urethane prepolymer was prepared using the polyoxyalkylene polyol. The results otained are shown in Table 1.

COMPARATIVE EXAMPLES 1 AND 2

The polyoxyalkylene polyol shown in Reference Example 1 or 2 was dried under normal dehydration conditions. The results obtained are shown in Table 1.

Preparation of Urethane Prepolymer

Using the polyoxyalkylene polyol obtained above, reaction was conducted in the same manner as in the Reference Examples. The results of odor test are shown in Table 1.

TABLE 1

| | | Reference Example | | Comparative Example | | Example | | | | | |
|---|---|---|---|---|---|---|---|---|---|---|---|
| | | 1 | 2 | 1 | 2 | 1 | 2 | 3 | 4 | 5 | 6 |
| Raw Materials | Polyoxypropylene glycol *1 (Molecular weight about 3,000) | 1000 | | 1000 | | 1000 | 1000 | 1000 | | | 500 |
| | Polyoxypropylene triyol *2 (Molecular weight about 6,000) | | 1000 | | 1000 | | | | 1000 | 1000 | 500 |
| Additives | Isoamyl amine | | | | | 1 | 1 | | | | |
| | 3-Decyloxypropyl amine | | | | | | | 0.1 | | | |
| | N-Methylstearyl amine | | | | | | | | 0.6 | | |
| | Stearyl amine | | | | | | | | | 0.3 | |
| | Polyoxypropylene amine *3 | | | | | | | | | | 10 |
| | Sodium sulfate | | | | | 5 | | | | | |
| Treatment Conditions | Temperature (° C.) | | | 100 | 100 | Room Temperature | 100 | 100 | 100 | 100 | 100 |

TABLE 1-continued

| | | Reference Example | | Comparative Example | | Example | | | | | |
|---|---|---|---|---|---|---|---|---|---|---|---|
| | | 1 | 2 | 1 | 2 | 1 | 2 | 3 | 4 | 5 | 6 |
| | Degree of reduced pressure (kPa) | | | 13.3 | 13.3 | Ordinary Pressure | 13.3 | 13.3 | 13.3 | 13.3 | 13.3 |
| | Time (h) | | | 12 | 12 | 48 | 12 | 12 | 12 | 12 | 12 |
| Results | Propylaldehyde (ppm) | 12 | 10 | 8 | 7 | 2 | 0.3 | 0.1 or less | 0.2 | 0.1 or less | 0.1 or less |
| | Odor of polyalkylene polyol | 2 | 2 | 2 | 2 | 3 | 3 | 4 | 3 | 4 | 4 |
| | Odor of urethane prepolymer | 2 | 2 | 2 | 3 | 3 | 3 | 4 | 3 | 4 | 4 |

*1 Excenol 3020: a product of Asahi Glass Co.
*2 Preminol 7001: a product of Asahi Glass Co.
*3 Jefermin D-400: a product of Sanseki Texaco Chemical Co.

As is apparent from the above test results, the commercially available polyoxypropylene glycols obviously have odor of propyl aldehyde. Even when such materials are dried under the general drying conditions (Comparative Examples), though the amount of aldehyde was decreased, difference in the odor is not recognized (when the residual amount of aldehyde is about 10 ppm, it was not felt that its odor reduces). If the polyoxyalkylene glycol is reacted with an amine in the presence of a dehydrating agent as in Example 1, the amount of aldehyde was decreased and its odor also reduced.

Further, if the reaction is conducted at 100° C. under reduced pressure, the odor was considerably suppressed. In the heating reaction under reduced pressure, the effect by amine increases as the boiling point of the amine is higher (Examples 2 and 3). The effect by a primary amine is larger than by a secondary amine (Examples 4 and 5).

The polyoxyalkylene polyol provided by the present invention has low aldehyde odor and does not generate offensive odor, so that odor does not cling after working. The present invention can obtain this low odor poloxyyalkylene polyol by a simple process. Further, various low odor synthetic products and molded products can be obtained using the low odor polyoxyalkylene polyol as a raw material. In particular, the polyoxyalkylene polyol according to the present invention is suitably used in products for use in a closed space, such as foamed urethane products for automotive upholsteries. In addition, owing to its low odor, it is suitably applicable to a wide range of uses such as coating compositions, sealing materials, adhesives, floor boards, surfactants, hydraulic oils, lubricants, cosmetics, sanitary goods, medical products and the like.

What is claimed is:

1. A process for reducing the aldehyde odor of a polyoxyalkylene polyol comprising adding a primary amine selected from the group of butyl amine, 1,2-dimethylbutyl amine, hexyl amine, isoamyl amine, 2-octyl amine, aminobutanol, 3-decyloxypropyl amine, 3-methoxypropyl amine, 3-isobutoxypropyl amine, 3-lauryloxypropyl amine, 3-myristyloxypropyl amine, lauryl amine, hexadecyl amine, stearyl amine, oleyl amine, polyoxypropylene amine, dimethylaminoethyl amine, ethylaminoethyl amine, diaminopropane, dibutylaminopropyl amine, 2-hydroxyethylaminopropyl amine, bis(3-aminopropyl) ether, diaminobutene, 1,9-nonane diamine, N-aminoethyl piperidine, N-aminopropyl morpholine, iminobispropyl amine, N,N'-bisaminopropyl-1,4-butylene diamine, and polyallyl amine to a polyoxyalkylene polyol having an acetoaldehyde or propionaldehyde odor, said polyoxyalkylene polyol being selected from the group of polypropylene polyol, polyoxyethylenepolyol and propylene oxide-ethylene oxide block copolymer, to form a mixture, and heating the resulting mixture to react the primary amine with the polyoxyalkylene polyol.

2. The method of claim 1, wherein the amount of the primary amine added to the polyoxyalkylene polyol is 10,000 ppm or less.

3. The method of claim 1, wherein said primary amine has a boiling point of 100° C. or higher under atmospheric pressure.

4. The method of claim 1, wherein said mixture is heated under a pressure of 39.9 kP or less.

5. The method of claim 1, wherein the primary amine is stearyl amine or lauryl amine.

6. A urethane prepolymer having a reduced aldehyde odor obtained by reacting said polyoxyalkylene polyol produced by the method of claim 1, with a polyisocyanate selected from the groups consisting of 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, toluidine diisocyanate, xylylene diisocyanate, hexamethylene diisocyanate, isophorone diisocyanate, naphthalene diisocyanate, paraphenylene diisocyanate, norbornene diisocyanate, isopropenyl-α,α dimethylbenzoyl diisocyanate, and tetramethyl xylylene diisocyanate.

7. A urethane composition having a reduced aldehyde odor containing the urethane prepolymer of claim 6.

\* \* \* \* \*